(12) United States Patent
Lee et al.

(10) Patent No.: US 7,436,457 B2
(45) Date of Patent: Oct. 14, 2008

(54) ANALOG/DIGITAL SIGNAL PROCESSOR AND ANALOG/DIGITAL SIGNAL PROCESSING METHOD

(75) Inventors: Jae-heung Lee, Suwon-si (KR); Noh-byung Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 11/025,371

(22) Filed: Dec. 30, 2004

(65) Prior Publication Data

US 2005/0193423 A1    Sep. 1, 2005

(30) Foreign Application Priority Data

Dec. 31, 2003    (KR) .................. 10-2003-0101586

(51) Int. Cl.
*H04N 3/27* (2006.01)
(52) U.S. Cl. ................... 348/554; 348/705; 725/151
(58) Field of Classification Search ......... 348/554, 348/555, 558, 705, 706, 731; 725/100, 131, 725/151
See application file for complete search history.

(56) References Cited

U.S. PATENT DOCUMENTS

| | | | | |
|---|---|---|---|---|
| 5,557,337 A | * | 9/1996 | Scarpa | ................. 348/558 |
| 5,574,787 A | | 11/1996 | Ryan | |
| 5,926,228 A | * | 7/1999 | Jeon et al. | ............... 348/554 |
| 6,058,191 A | | 5/2000 | Quan | |
| 6,104,437 A | * | 8/2000 | Taira et al. | ............... 348/563 |
| 6,240,185 B1 | | 5/2001 | Van Wie et al. | |
| 6,381,747 B1 | | 4/2002 | Wonfor et al. | |
| 6,944,877 B1 | * | 9/2005 | Lord et al. | ................. 725/32 |
| 2001/0038422 A1 | | 11/2001 | Yamada et al. | |
| 2005/0149635 A1 | * | 7/2005 | Otsuka et al. | ................ 710/1 |

FOREIGN PATENT DOCUMENTS

| | | |
|---|---|---|
| CN | 1159272 A | 9/1997 |
| EP | 1 094 626 | 4/2001 |
| EP | 1 176 822 | 1/2002 |
| JP | 10-210436 A | 8/1998 |
| JP | 2000-232803 A | 8/2002 |
| KR | 96-16599 A | 5/1996 |
| KR | 2000-0029125 A | 5/2000 |
| KR | 10-2004-0039106 A | 5/2004 |
| WO | WO 97/15142 A1 | 4/1997 |
| WO | WO 97/16022 A1 | 5/1997 |
| WO | 0163911 | 8/2001 |

* cited by examiner

*Primary Examiner*—M. Lee
(74) *Attorney, Agent, or Firm*—Sughrue Mion, PLLC

(57) ABSTRACT

An analog/digital signal processor outputting analog input signals without eliminating copy protection signals from analog input signals, analog input signals having been subjected to copy protection process such as macrovision without adding complicated processes. The analog/digital signal processor for receiving input signals and outputting received input signals to a predetermined appliance through an analog or a digital communication unit, includes: a control unit determining whether the input signals are digital or analog signals and controlling a processing path and an output path of the input signals in accordance with the determination result; and a switching unit switching the input signals to the analog or the digital communication unit under the control of the control unit. When the input signals are analog signals, the control unit sets the processing path of the input signals to the switching unit and the switching unit switches the input signals to the analog communication unit.

18 Claims, 10 Drawing Sheets

ANALOG/DIGITAL SIGNAL PROCESSOR AND ANALOG/DIGITAL SIGNAL PROCESSING METHOD

This application claims the priority of Korean Patent Application No. 2003-101586, filed on Dec. 31, 2003, in the Korean Intellectual Property Office, the disclosure of which is incorporated herein in its entirety by reference.

BACKGROUND OF THE INVENTION

1. Field of the Invention

The present invention relates to an analog/digital signal processor and an analog/digital signal processing method, and more particularly, to an analog/digital signal processor such as a multi-purpose digital set-top box and an analog/digital signal processing method which can simply output externally-input analog signals without eliminating additional data such as copy protection data included in the externally-input analog signals.

2. Description of the Related Art

FIG. 1 is a block diagram illustrating a conventional multi-purpose digital set-top box.

A digital set-top box 10 includes a broadcasting signal receiving unit 102 receiving broadcasting signals such as ground wave broadcasting signals, satellite broadcasting signals, cable broadcasting signals, etc. and outputting the received broadcasting signals as analog broadcasting signals or digital broadcasting signals under the control of a control unit 116, an MPEG-2 encoder 104 converting the analog broadcasting signals output from the broadcasting signal receiving unit 102 and the analog signals received through an external analog signal input appliance such as a DVD player into digital signals of MPEG-2 transport streams, a digital communication unit 106 outputting the MPEG-2 transport streams output from the broadcasting signal receiving unit 102 and the MPEG-2 encoder 104 to an external display appliance such as a digital TV, an MPEG-2 decoder 108 converting the MPEG-2 transport streams output from the broadcasting signal receiving unit 102 and the MPEG-2 encoder 104 as analog signals and outputting the converted analog signals under the control of the control unit 116, an analog communication unit 110 outputting the analog signals output from the MPEG-2 decoder 108 to an external analog playback appliance such as an analog TV or a VCR, a channel selecting unit 112 receiving the selected channel and outputting the received channel to the control unit 116 when a user selects a predetermined channel through channel selection and an input device such as a remote control, a channel map memory 114 storing data on the broadcasting channels selected by a viewer, and a control unit 116 controlling a broadcasting signal process according to the type of broadcasting signal received from the broadcasting signal receiving unit 102 with reference to the channel map memory 114 based on channel selection signals from the channel selecting unit 112 and controlling operations of other elements of the digital set-top box 10.

When a viewer selects a desired broadcasting channel through the remote control, the channel selecting unit 112 transmits the selected broadcasting channel to the control unit 116. The control unit 116 determines the type of the selected broadcasting channel and whether the selected broadcasting channel transmits analog signals or digital signals with reference to the channel map memory 114, and controls operations of the broadcasting signal receiving unit 102.

A network information table (NIT) and a bouquet association table (BAT) are stored to a memory of the set-top box for receiving digital broadcasting, so that the control unit can read physical data and service data of the channel. The channel map memory 114 can additionally store the physical data and the service data of analog broadcasting signals to the NIT and the BAT. Further, the channel map memory 114 includes data on whether broadcasting channels transmit digital signals or analog signals. However, in order to simplify the set-top box, it is possible to exclude the channel selecting unit 112 and the channel map memory 114 from the set-top box, and transmit the selected channel data among channel data stored to an external display appliance such as a digital TV, etc., to the set-top box through the digital communication unit 106. In the meantime, the set-top box 10 may further comprise an MPEG-2 transport stream parsing unit for parsing MPEG-2 transport streams to audio signals and video signals and outputting the parsed audio signals and video signals. However, it helps to reduce a radio network load to transmit not the parsed data but the MPEG-2 transport streams for transmitting data to the digital TV by using radio communication channels.

The broadcasting signal receiving unit 102 comprises a tuner unit (not shown) for selecting ground wave broadcasting, satellite broadcasting, and cable broadcasting by a viewer's selection and converting signals of the selected broadcasting into intermediate frequency signals, and a demodulation unit (not shown) for executing a predetermined demodulation by selecting the tuner unit. The broadcasting signal receiving unit 102 outputs demodulated signals into analog signals when broadcasting signals are analog signals, and outputs demodulated signals to digital signals of the MPEG-2 transport streams when broadcasting signals are digital signals.

In the meantime, a DVD player executes a copy protection process such as macrovision for copyright protection ordinarily when outputting data of a DVD that is a digital recording medium. When externally-input analog signals that have gone through a macrovision process pass through the MPEG-2 encoder, copy protection signals disappear, so that the macrovision process is meaningless.

Therefore, in order to solve the aforementioned problem, elimination of copy protection signals may be prevented by using an encoding method suitable for analog signals that have gone through the macrovision process by adding a macrovision detection function to the MPEG-2 encoder 104.

However, since such a method should additionally perform an operation for detecting analog signals that have gone through the macrovision process and an encoding operation suitable for analog signals that have gone through the macrovision process, there is a problem in that a structure of the set-top box becomes overly complicated.

SUMMARY OF THE INVENTION

The present invention provides an analog/digital signal processor such as a multi-purpose digital set-top box capable of simply outputting analog input signals without eliminating copy protection signals included in the analog input signals through a copy protection process such as a macrovision process without adding a complicated operation, and an analog/digital signal processing method.

According to an aspect of the present invention, there is provided an analog/digital signal processor for receiving analog/digital input signals and outputting the analog/digital input signals to a predetermined appliance through an analog communication unit or a digital communication unit, the processor comprising: a control unit determining whether the analog/digital input signals are digital signals or analog signals and controlling a processing path and an output path of the input signals in accordance with the determination result; and a switching unit switching the input signals to the analog communication unit or the digital communication unit under the control of the control unit.

When the input signals are analog signals, the control unit may set the processing path of the input signals to the switching unit and the switching unit may switch the input signals to the analog communication unit.

The analog/digital signal processor may further comprise an encoding unit encoding the input signals and a decoding unit decoding the signals encoded by the encoding unit or the input signals.

When the input signals are digital signals, the control unit may set the processing path of the input signals to the decoding unit, and the decoding unit may decode the input signals and output the decoded input signals to the analog communication unit.

When the input signals are analog signals, the control unit may set the processing path of the input signal to the switching unit, the switching unit may switch the input signals to the encoding unit, and the encoding unit may encode the input signals into digital signals and output the digital signals to the digital communication unit.

The received input signals may be playback signals regenerated by the predetermined appliance.

According to another aspect of the present invention, there is provided an analog/digital signal processor for receiving analog/digital input signals and outputting the analog/digital input signals to a predetermined appliance through an analog communication unit or a digital communication unit, the processor comprising: a broadcasting signal receiving unit receiving and processing broadcasting signals such as ground wave broadcasting signals, cable broadcasting signals, and satellite broadcasting signals; an external signal receiving unit receiving playback signals regenerated by the predetermined appliance; a control unit determining whether the analog/digital input signals received by the broadcasting signal receiving unit and the external signal receiving unit are digital signals or analog signals and controlling a processing path and an output path of the input signals in accordance with the determination result; and a switching unit switching the input signals to the analog communication unit or the digital communication unit under the control of the control unit.

When the playback signals are analog signals, the control unit may set the processing path of the playback signals to the switching unit and the switching unit may switch the playback signals to the analog communication unit.

When the broadcasting signals are analog signals, the control unit may set the processing path of the broadcasting signals to the switching unit and the switching unit may switch the broadcasting signals to the analog communication unit.

The analog/digital signal processor may further comprise an encoding unit encoding the input signals and a decoding unit decoding signals encoded by the encoding unit, the broadcasting signals, and the playback signals.

When the input signals are digital signals, the control unit may set the processing path of the input signals to the decoding unit, and the decoding unit may decode the input signals to the analog signals and output the analog signals to the analog communication unit.

When the input signals are analog signals, the control unit may set the processing path of the input signal to the switching unit and the switching unit may switch the input signals to the encoding unit.

According to another aspect of the present invention, there is provided a multi-purpose digital set-top box for receiving and processing broadcasting signals and externally-input analog signals and outputting the processed broadcasting signals and the processed externally-input analog signals to an external digital display appliance or an external analog playback appliance through a digital communication unit or an analog communication unit, the set-top box comprising: an encoding unit encoding the externally-input analog signals into digital broadcasting signals and outputting the digital broadcasting signals to the digital communication unit; a switching unit switching the externally-input analog signals input to the encoding unit to the analog communication unit; and a control unit controlling overall operations of the set-top box.

When the broadcasting signals are analog broadcasting signals, the analog broadcasting signals may be encoded into digital broadcasting signals by the encoding unit and output to the digital communication unit or switched to the analog communication unit by the switching unit.

The multi-purpose digital set-top box may further comprise a decoding unit decoding digital broadcasting signals into analog broadcasting signals and outputting the analog broadcasting signals, and when the broadcasting signal are analog broadcasting signals, the analog broadcasting signals may be encoded into digital broadcasting signals by the encoding unit and output to the digital communication unit or the decoding unit, and the switching unit may switch the output of the decoding unit to the analog communication unit.

The digital communication unit may communicate with the external digital display appliance through a radio communication channel.

The digital communication unit and the analog communication unit may constitute one communication module.

According to another aspect of the present invention, there is provided a signal processing method of a multi-purpose digital set-top box for receiving and processing broadcasting signals and externally-input analog signals and outputting the processed broadcasting signals and the processed externally-input analog signals to an external digital display appliance or an external analog playback appliance, the method comprising: (a) encoding the externally-input analog signals into digital broadcasting signals and outputting the digital broadcasting signals to the external digital display appliance; and (b) directly outputting the externally-input analog signals to the external analog playback appliance; and (a) and (b) may be simultaneously or selectively performed.

When the broadcasting signals are analog broadcasting signals, the signal processing method may further comprise: (c) encoding the analog broadcasting signals into digital broadcasting signals and outputting the digital broadcasting signals to the external digital display appliance and directly decoding the digital broadcasting signals into the external analog broadcasting signals; and (d) directly outputting the analog broadcasting signals to the external analog playback appliance; and (c) and (d) may be simultaneously or selectively performed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, the present invention will be described in more detail with reference to the accompanying drawings.

Figure 1:
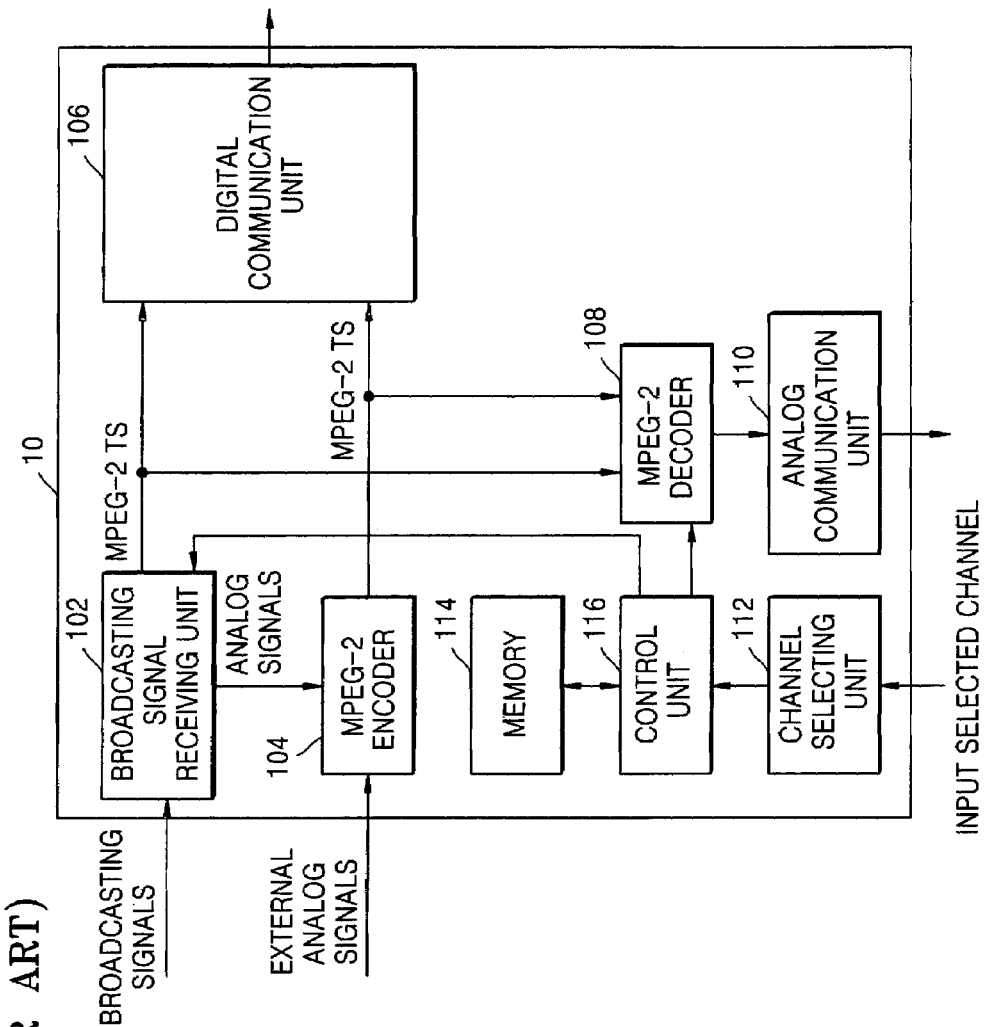
FIG. 1 is a block diagram illustrating a conventional multi-purpose digital set-box.
Figure 2:
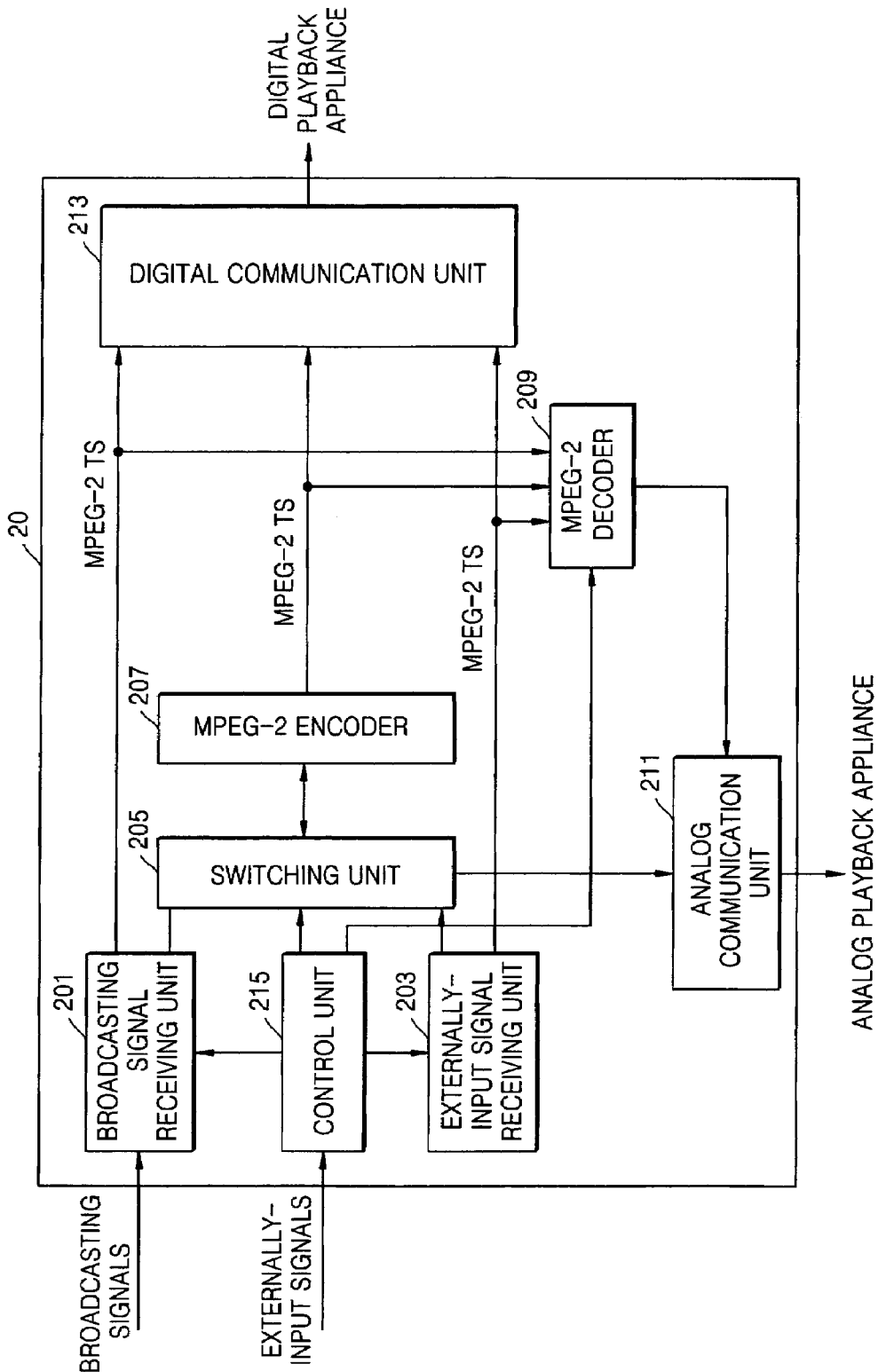
FIG. 2 is a block diagram of an analog/digital signal processor according to an exemplary embodiment of the present invention.

FIG. 2 is a block diagram of an analog/digital signal processor according to an exemplary embodiment of the present invention. Further, an analog/digital signal processor 20 can be used as a multi-purpose set-top box for processing broadcasting signals or externally-input signals from an external playback appliance, for example, and re-transmitting the processed broadcasting signals or externally-input signals to an external playback appliance such as a TV.

The signal processor 20 comprises a broadcasting signal receiving unit 201 receiving signals of broadcasting such as ground wave broadcasting, satellite broadcasting, and cable broadcasting, etc. and outputting the received broadcasting signals to analog broadcasting signals or digital broadcasting signals, an externally-input signal receiving unit 203 receiving externally-input signals from an external playback appliance such as a DVD player and outputting the received externally-input signals to analog input signals or digital input signals, a switching unit 205 receiving analog broadcasting signals and analog input signals from the broadcasting signal receiving unit 201 and the externally-input signal receiving unit 203 switching the received analog broadcasting signals and the analog input signals to an MPEG-2 encoder 207 or an analog communication unit 211, an MPEG-2 encoder 207 encoding analog broadcasting signals and analog input signals into digital signals of MPEG-2 transport streams, an MPEG-2 decoder 209 decoding digital signals of MPEG-2 transport streams output from the broadcasting signal receiving unit 201, the externally-input signal receiving unit 203, and the MPEG-2 encoder 207 into analog signals, an analog communication unit 211 outputting the analog signals output from the switching unit 205 and the MPEG-2 decoder 209 to an analog playback appliance such as an analog TV or a VCR, a digital communication unit 213 outputting the digital signals of MPEG-2 transport streams output from the broadcasting signal receiving unit 201, the externally-input signal receiving unit 203, and the MPEG-2 encoder 207 to a digital playback appliance such as a digital TV, and a control unit 215 controlling operations of the broadcasting signal receiving unit 201, the externally-input signal receiving unit 203, the switching unit 205, and the MPEG-2 decoder 209, etc.

The broadcasting signal receiving unit 201 receives various broadcasting signals such as ground wave broadcasting signals, satellite broadcasting signals, and cable broadcasting signals, etc., selects and demodulates the received signals into a suitable type for broadcasting, and outputs analog broadcasting signals to the switching unit 205 and the digital broadcasting signals of MPEG-2 transport streams to the digital communication unit 213 and the MPEG-2 decoder 209 under the control of the control unit 215.

In the meantime, because ground wave broadcasting, satellite broadcasting, and cable broadcasting adapt different broadcasting systems, the broadcasting signal receiving unit 201 should have a tuner unit (not shown) and a demodulation unit (not shown) suitable for each broadcasting system. For example, the broadcasting signal receiving unit 201 may have a QFDM demodulation unit, a QPSK demodulation unit, and a QAM demodulation unit for ground wave broadcasting, satellite broadcasting, and cable broadcasting, respectively.

Further, because the digital broadcasting can set channel data including data on digital broadcasting signals and broadcasting system data in accordance with the channels to the set-top box 20 or a channel map memory of a digital TV, when a viewer selects a broadcasting channel through an input device such as a remote control, the control unit 215 allows the broadcasting signal receiving unit 201 to perform selection and demodulation operations based on the type of broadcasting signals according to the search result of the channel map memory and determines an output direction of signals output from the broadcasting signal receiving unit 201 depending on whether the selected broadcasting channel is an analog broadcasting channel or a digital broadcasting channel.

Further, because a particular copy protection process is not performed for the current analog broadcasting signals, the analog broadcasting signals may be directly output through the analog communication unit 211 without encoding into digital broadcasting signals. However, due to the change in the broadcasting environment and because a copy protection process is performed for even analog broadcasting signals, it is preferable, but not necessary, to directly output analog broadcasting signals received from the broadcasting signal receiving unit 201 from the analog communication unit 211 via the switching unit 205 without MPEG-2 encoding and decoding under the control of the control unit 215.

The externally-input signal receiving unit 203 receives digital signals or analog signals through a copy protection process such as a macrovision process from a playback appliance such as a DVD player, and outputs analog input signals to the switching unit 205 and digital input signals to the digital communication unit 213 and the MPEG-2 decoder 209 under the control of the control unit 215. Further, the control unit 215 allows the receiving units 201 and 203 to determine an output direction of digital input signals or allows the MPEG-2 decoder 209 to capture digital signals output from the receiving units 201 and 203. Otherwise, as another switching unit (not shown) is arranged between the digital communication unit 213 and the MPEG-2 decoder 209 and the control unit 215 controls the switching unit, an output route of digital signals may be determined.

The MPEG-2 encoder 207 and the MPEG-2 decoder 209 are elements for encoding and decoding analog (broadcasting) signals according to an MPEG-2 compression method adapted as a current digital broadcasting standard, but the present invention is not particularly limited to the MPEG-2 compression method.

Further, in this embodiment, the digital communication unit 213 and the analog communication unit 211 are separated from each other, but may be combined with one module.

Now, operations of the analog/digital signal processor 20 according to this embodiment will be described.

The control unit 215 allows the broadcasting signal receiving unit 201 and the externally-input signal receiving unit 203 to output digital broadcasting signals and digital externally-input signals to the digital communication unit 213 and the MPEG-2 decoder 209. In the meantime, according to a user's selection, digital signals may be output simultaneously or selectively to the digital communication unit 213 and the MPEG-2 decoder 209.

Further, analog broadcasting signals and externally-input analog signals are output to the switching unit 205 under the control of the control unit 215. For example, when a user selects to watch an analog playback appliance such as an analog TV, the switching unit 205 switches analog input signals to the analog communication unit 211, or when a user selects to watch a digital playback appliance such as a digital TV, the switching unit 205 outputs the analog input signals to the MPEG-2 encoder 207. The MPEG-2 encoder 207 outputs the digital signals of the encoded MPEG-2 transport streams to the digital communication unit 213. Therefore, even if a copy protection process such as a macrovision process is performed for analog broadcasting signals or externally-input analog signals, the analog broadcasting signals or the externally-input analog signals are directly output to the analog communication unit 211 without MPEG-2 encoding and decoding, so that an elimination of a copy protection process does not result.

Figure 3:
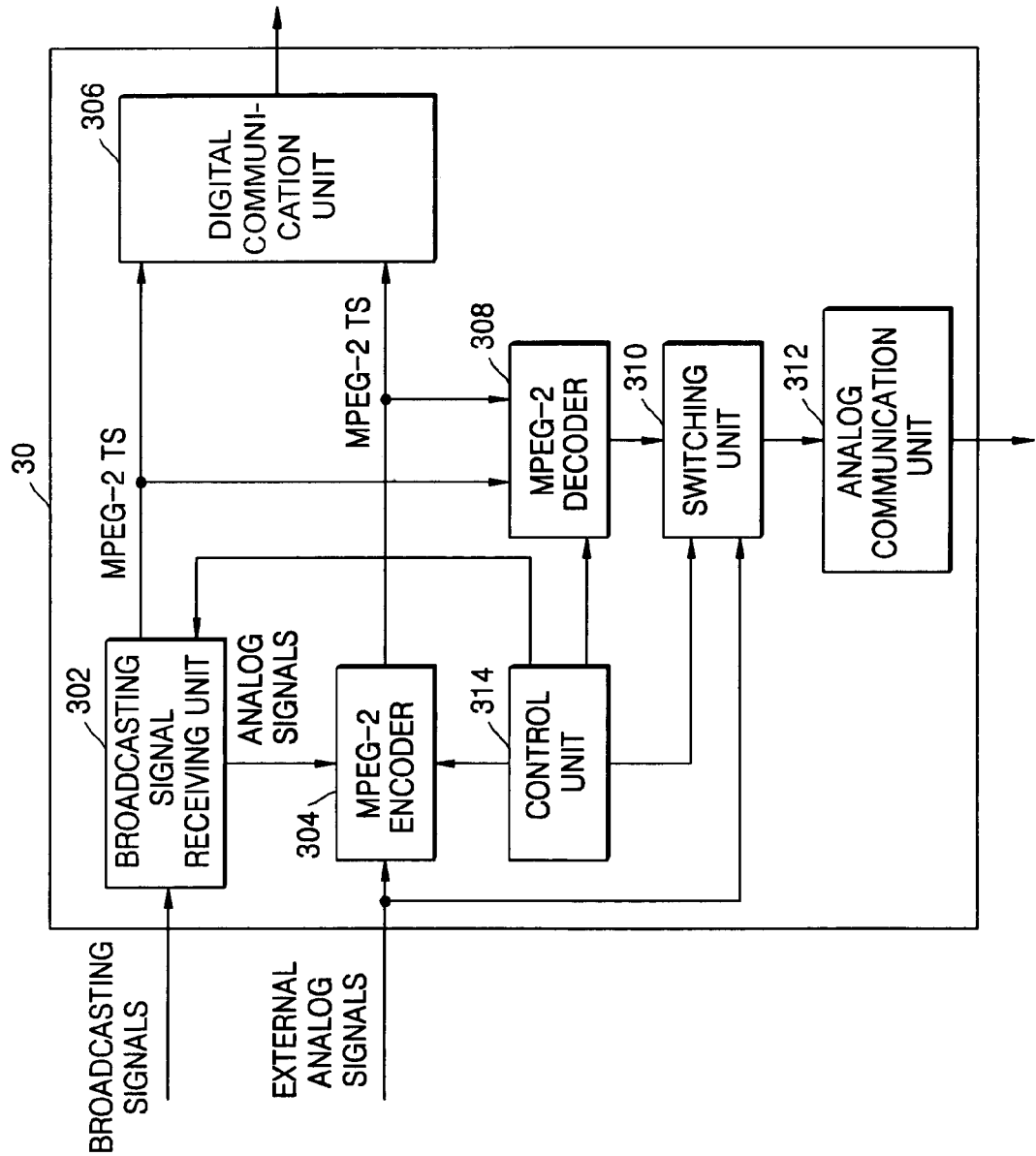
FIG. 3 is a block diagram of a multi-purpose digital set-top box according to another embodiment of the present invention.

FIG. 3 is a block diagram of a multi-purpose digital set-top box according to another embodiment of the present invention. In the meantime, the digital set-top box 30 of the present invention is generally designated as a signal receiving appliance for receiving broadcasting signals and externally-input analog signals, processing the received broadcasting signals to be suitable for a digital broadcasting system, and outputting the processed broadcasting signals to the digital TV and an external analog playback appliance.

The multi-purpose digital set-top box 30 comprises a broadcasting signal receiving unit 302 for receiving signals of broadcasting such as ground wave broadcasting, satellite broadcasting, and cable broadcasting, etc. and outputting the broadcasting signals to analog signals or digital signals under the control of the control unit 314, an MPEG-2 encoder 304 for converting analog broadcasting signals output from the broadcasting signal receiving unit 302 and externally-input analog signals received from an external analog signal input appliance such as a DVD player into digital signals of MPEG-2 transport streams, a digital communication unit 306 for outputting the MPEG-2 transport streams output from the broadcasting signal receiving unit 302 and the MPEG-2 encoder 304 to an external display appliance such as a digital TV, an MPEG-2 decoder 308 for converting MPEG-2 transport streams output from the broadcasting signal receiving unit 302 and the MPEG-2 encoder 304 into analog signals under the control of the control unit 314 and outputting the converted analog signals, a switching unit 310 for selecting one of externally-input analog signals input to the MPEG-2 encoder 304 and analog signals output from the MPEG-2 decoder 308 and outputting the selected signals under the control of the control unit 314, an analog communication unit 312 for outputting the analog signals output from the switching unit 310 to an external analog playback appliance such as an analog TV or a VCR, and a control unit 314 for controlling the broadcasting signal process of the broadcasting signal receiving unit 302 according to the type of broadcasting signals that are to be received, controlling output signals of the switching unit 310, and controlling operations of other elements of the set-top box 30.

The broadcasting signal receiving unit 302 receives various signals of broadcasting such as ground wave broadcasting, satellite broadcasting, and cable broadcasting, etc., selects and demodulates the received signals into a suitable type for broadcasting, and outputs analog broadcasting signals to the MPEG-2 decoder 304 and digital broadcasting signals of MPEG-2 transport streams to the digital communication unit 306 and the MPEG-2 decoder 308 under the control of the control unit 314.

In the meantime, because ground wave broadcasting, satellite broadcasting, and cable broadcasting adapt different broadcasting systems, the broadcasting signal receiving unit 302 should have a tuner unit (not shown) and a demodulation unit (not shown) suitable for each broadcasting system. For example, the broadcasting signal receiving unit 302 may have a QFDM demodulation unit, a QPSK demodulation unit, and a QAM demodulation unit for ground wave broadcasting, satellite broadcasting, and cable broadcasting, respectively.

Further, because digital broadcasting can set channel data including data on digital broadcasting signals and broadcasting system data according to channels to the set-top box 30 or the channel map memory of the digital TV, when a viewer selects a broadcasting channel through an input device such as a remote control, the control unit 314 allows the broadcasting signal receiving unit 302 to perform selection and demodulation operations based on the type of broadcasting signals according to the search result of the channel map memory and determines an output direction of signals output from the broadcasting signal receiving unit 302 depending on whether the selected broadcasting channel is an analog broadcasting channel or a digital broadcasting channel.

Further, in this embodiment, because the particular copy protection process is not performed for current analog broadcasting signals, it is not directly outputting analog broadcasting signals through the analog communication unit 312 without encoding into digital broadcasting signals is not considered. However, due to the change of the broadcasting environment, when the copy protection process is performed for even analog broadcasting signals, it is possible to directly output analog broadcasting signals received from the broadcasting signal receiving unit 302 from the analog communication unit 312 via the switching unit 310 without MPEG-2 encoding and decoding under the control of the control unit 314.

The MPEG-2 encoder 304 and the MPEG-2 decoder 308 are elements for encoding and decoding analog (broadcasting) signals according to an MPEG-2 compression method adapted as a current digital broadcasting standard, but the present invention is not particularly limited to the MPEG-2 compression method.

Further, in this embodiment, the digital communication unit 306 and the analog communication unit 312 are separated from each other, but may be combined with one module.

Now, operations of the multi-purpose digital set-top box 30 according to each situation will be described with reference to FIGS. 4 to 6. Further, for the convenience of explanation, only elements required for each operation are shown in FIGS. 4 to 6.

A. Receiving Digital Broadcasting Signals (FIG. 4)

Figure 4A:
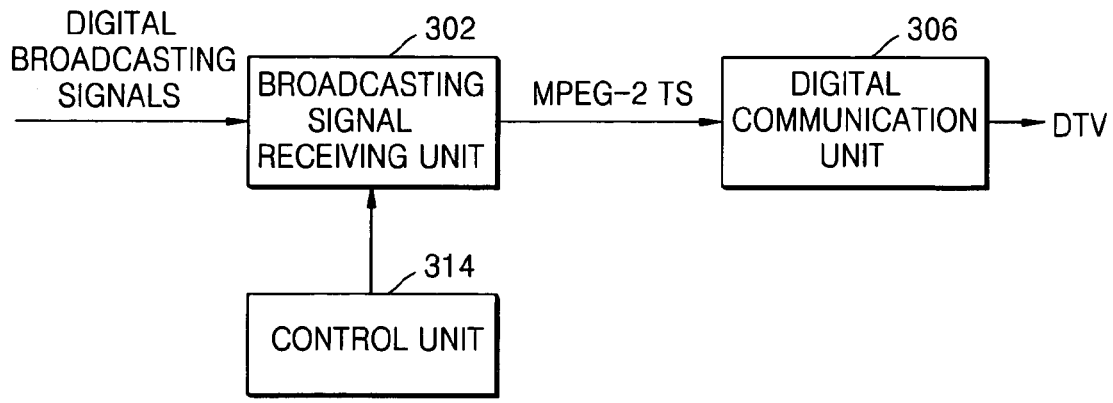
FIGS. 4A and 4B are block diagrams illustrating operations of the multi-purpose digital set-top box when receiving digital broadcasting signals with a digital TV or an analog TV.

When a viewer watches digital broadcasting with a digital TV, as shown in FIG. 4A, the broadcasting signal receiving unit 302 outputs digital broadcasting signals of MPEG-2 transport streams to the digital communication unit 306 under the control of the control unit 314, and the digital communication unit 306 transmits the MPEG-2 transport streams to a digital TV through a wire or a radio communication channel.

Figure 4B:
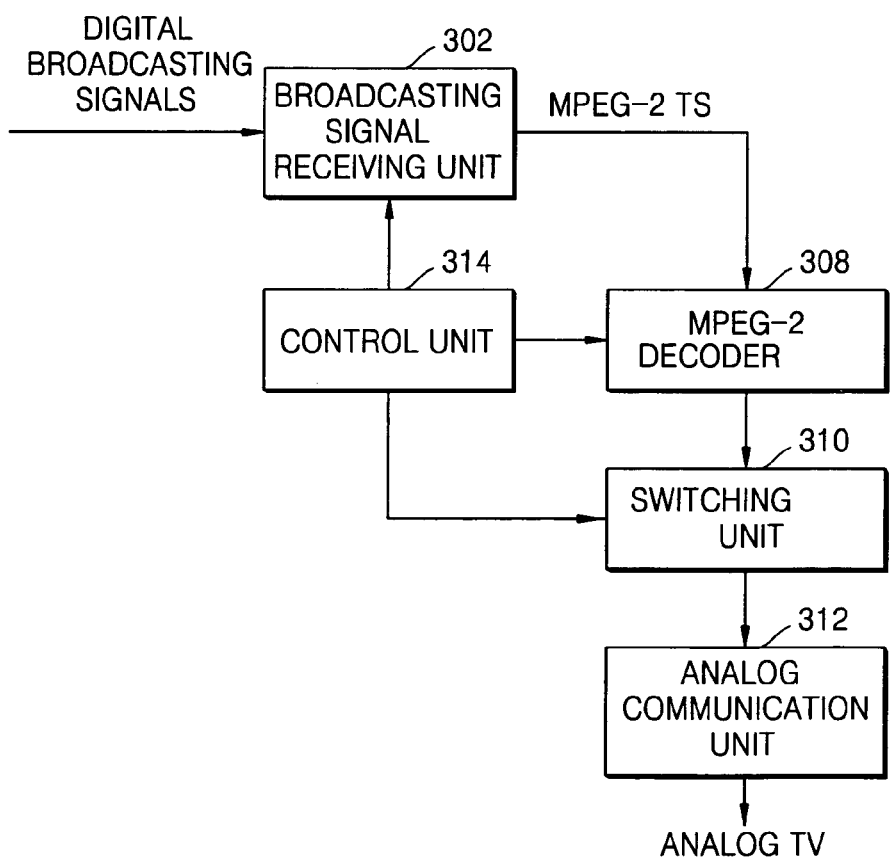

In the meantime, when a viewer wishes to watch digital broadcasting channel with an analog TV or to record digital broadcasting with an analog recording appliance such as a VCR, as shown in FIG. 4B, the control unit 314 allows the MPEG-2 decoder 308 to decode MPEG-2 transport streams output from the broadcasting signal receiving unit 302 into analog broadcasting signals and connects an input terminal of the switching unit 310 to the MPEG-2 decoder 308. Therefore, digital broadcasting signals are output to an analog TV or a VCR through the MPEG-2 decoder 308, the switching unit 310, and the analog communication unit 312.

At this time, the control unit 314 can determine whether an output direction of digital broadcasting signals based on data input by a viewer through an input selection unit (not shown) in the set-top box 30 or a digital TV is a digital TV or an external analog playback appliance such as an analog TV or a VCR. Further, when analog signals having been subjected to the copy protection process pass through a digital encoder such as the MPEG-encoder 304, the copy protection process is meaningless. However, when the digital signals having been subjected to the copy protection process pass through the MPEG-2 decoder 308, the copy protection data are not eliminated. Therefore, a copy protection function does not disappear when receiving digital broadcasting signals with an analog TV or recording with an analog recording appliance such as a VCR.

B. Receiving Analog Broadcasting Signals (FIG. 5)

Figure 5A:
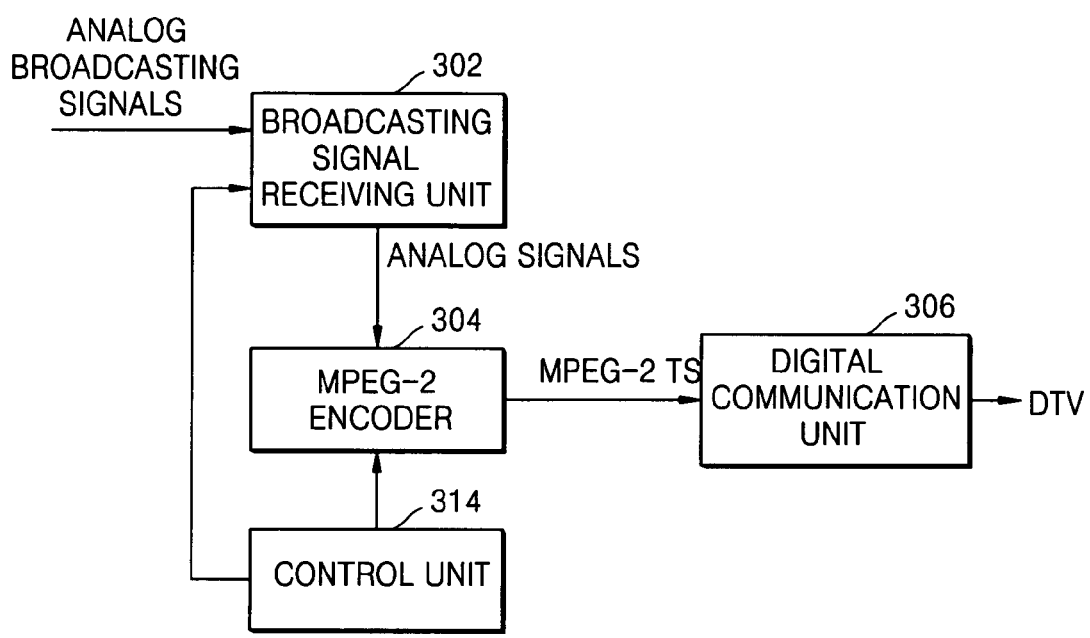
FIGS. 5A, 5B and 5C are block diagrams illustrating operations of the multi-purpose digital set-top box when receiving analog broadcasting signals with the digital TV or the analog TV.

When a viewer wishes to receive analog broadcasting signals and watch analog broadcasting through a digital TV, as shown in FIG. 5A, the control unit 314 allows the broadcasting signal receiving unit 302 and the MPEG-2 encoder 304 to encode analog broadcasting signals into digital broadcasting signals of MPEG-2 transport streams and output the encoded digital broadcasting signals.

Figure 5B:
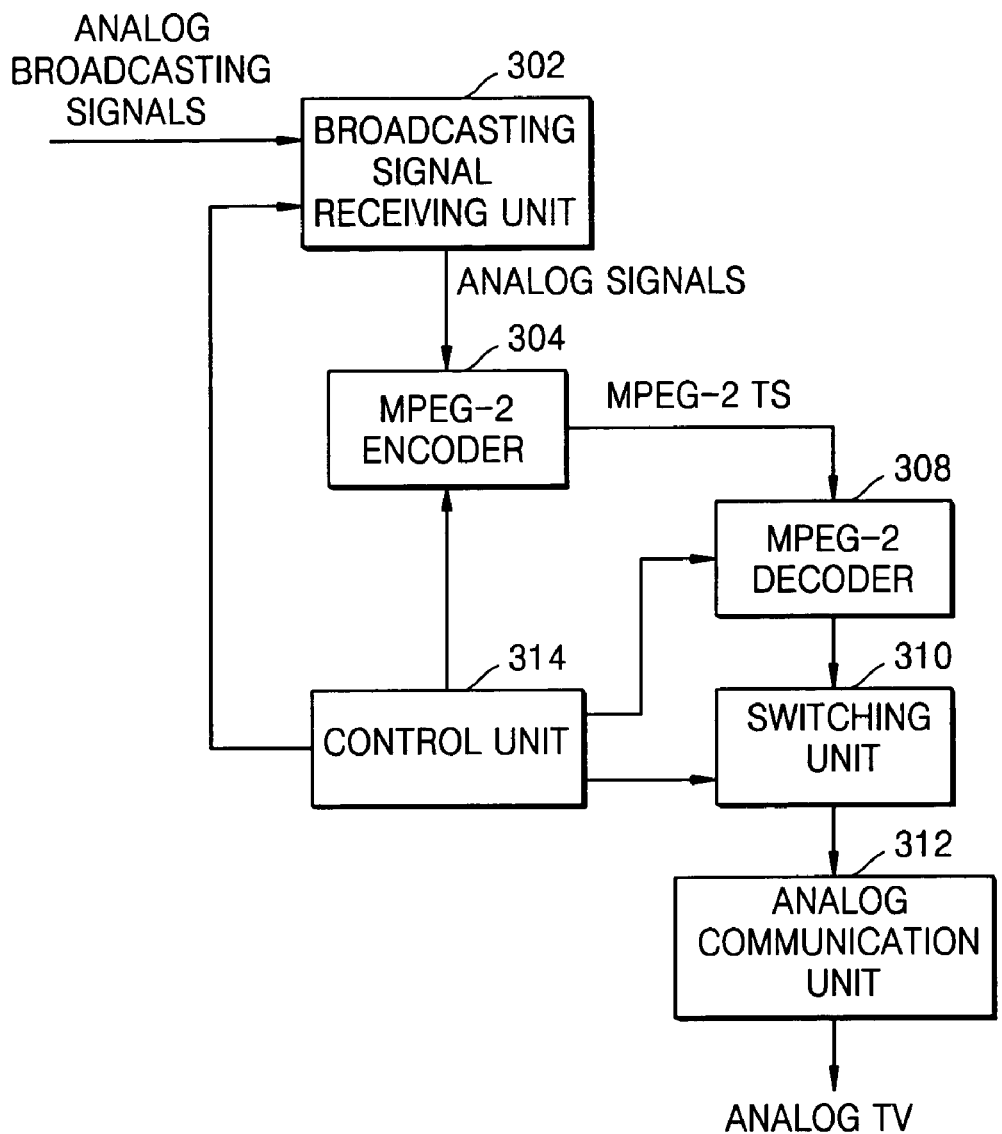
Figure 5C:
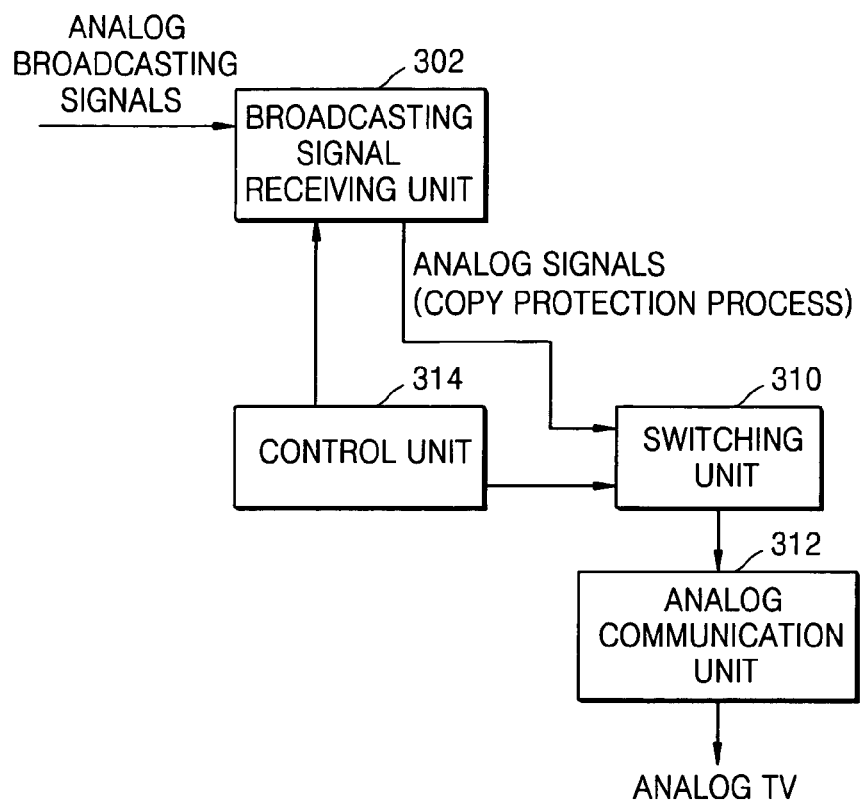

Further, when a viewer wishes to watch analog broadcasting with an analog TV or to record analog broadcasting with an analog recording appliance such as a VCR, as shown in FIG. 5B, under the control of the control unit 314, the analog broadcasting signals are output through the broadcasting signal receiving unit 302, the MPEG-2 encoder 304, the MPEG-2 decoder 308, the switching unit 310, and the analog communication unit 312.

In the meantime, when the copy protection process is not preformed for analog broadcasting signals, operations of FIG. 5B do not matter. However, when analog broadcasting signals through the copy protection process pass through the MPEG-2 encoder 304, copy protection signals disappear, so that a copyright protection problem may result. Therefore, in order to playback or record broadcasting signals without eliminating copy protection signals included in the analog broadcasting signals through the copy protection process, as shown in FIG. 4C, the control unit 314 allows the broadcasting signal receiving unit 302 to directly output the analog broadcasting signals to the switching unit 310.

Therefore, it is preferable, but not necessary, that the control unit 314 allows an input terminal of the switching unit 310 to directly connect to the broadcasting signal receiving unit 302 when outputting the analog broadcasting signals to the external analog playback appliance.

C. Inputting External Analog Signals (FIG. 6)

Figure 6A:
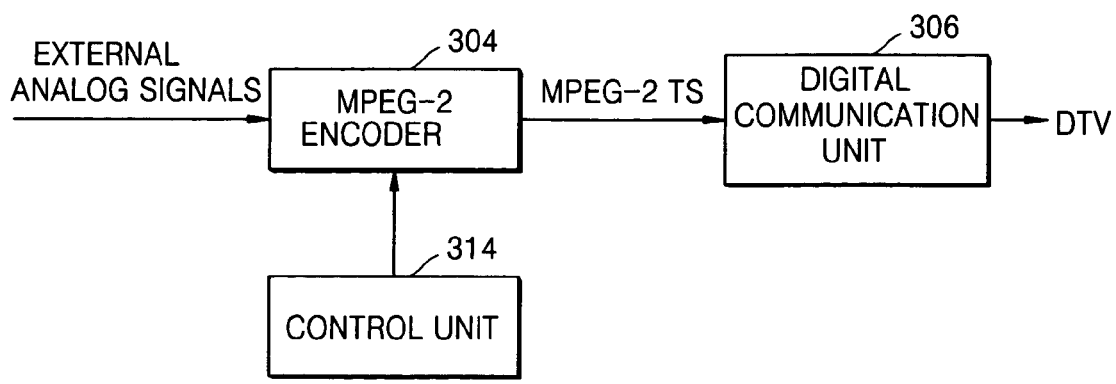
FIGS. 6A and 6B are block diagrams illustrating operations of the multi-purpose digital set-top box when receiving externally-input analog signals with the digital TV or the analog TV.

When a viewer wishes to playback analog signals input from a digital recording medium playback appliance such as a DVD player with a digital TV, as shown in FIG. 6A, the control unit 314 allows the MPEG-2 encoder 304 to convert external analog signals into digital signals of MPEG-2 transport streams and to output to the digital communication unit 306. At this time, if the copy protection process such as a macrovision process is performed for the external analog signals, when the external analog signals pass through the MPEG-2 encoder 304, copy protection signals disappear. However, since the MPEG-2 transport streams having been subjected to the encryption processing are regenerated in only authorized digital televisions, temporary disappearance of the copy protection signals do not matter.

Figure 6B:
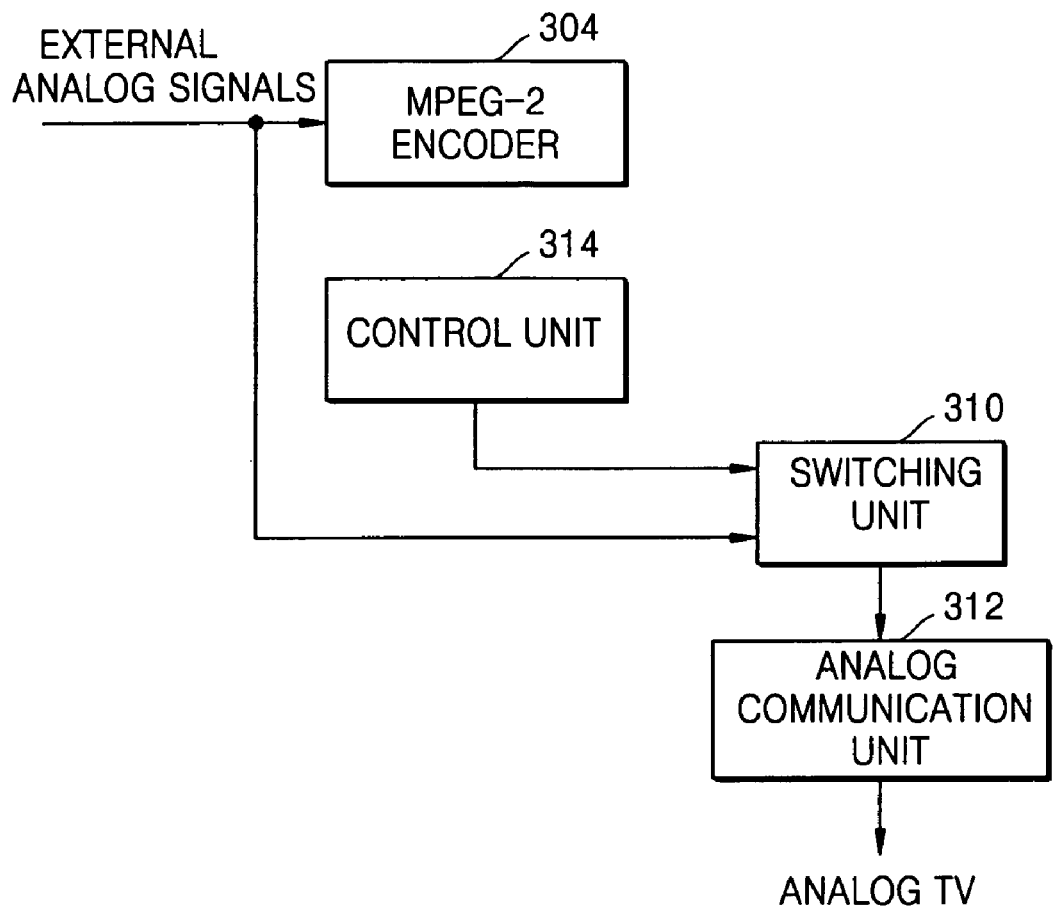

In the meantime, when outputting external analog signals to an analog playback appliance such as an analog TV or a VCR, as shown in FIG. 6B, the control unit 314 allows the switching unit 310 to directly output the external analog signals through the analog communication unit 312 without passing through the MPEG-2 encoder 304, or the control unit 314 allows the MPEG-2 encoder 304 to connect to an input terminal of the switching unit 310 and to output to the switching unit 310 without encoding analog signals input to the MPEG-2 encoder 304. Therefore, by simply adapting the switching unit 310, it is possible to conveniently prevent copy protection signals included in external analog signals through the copy protection process such as macrovision from being eliminated in a digital encoding process.

Up to now, receiving broadcasting signals or external analog signals and watching a digital TV or an analog TV has been described. In some cases, the set-top box 30 may be operated to receive the broadcasting signals or the external analog signals and to watch a digital TV and an analog TV.

Now, a signal processing method to be performed by the set-top box 30 will be described with reference to FIGS. 7 and 8.

Figure 7:
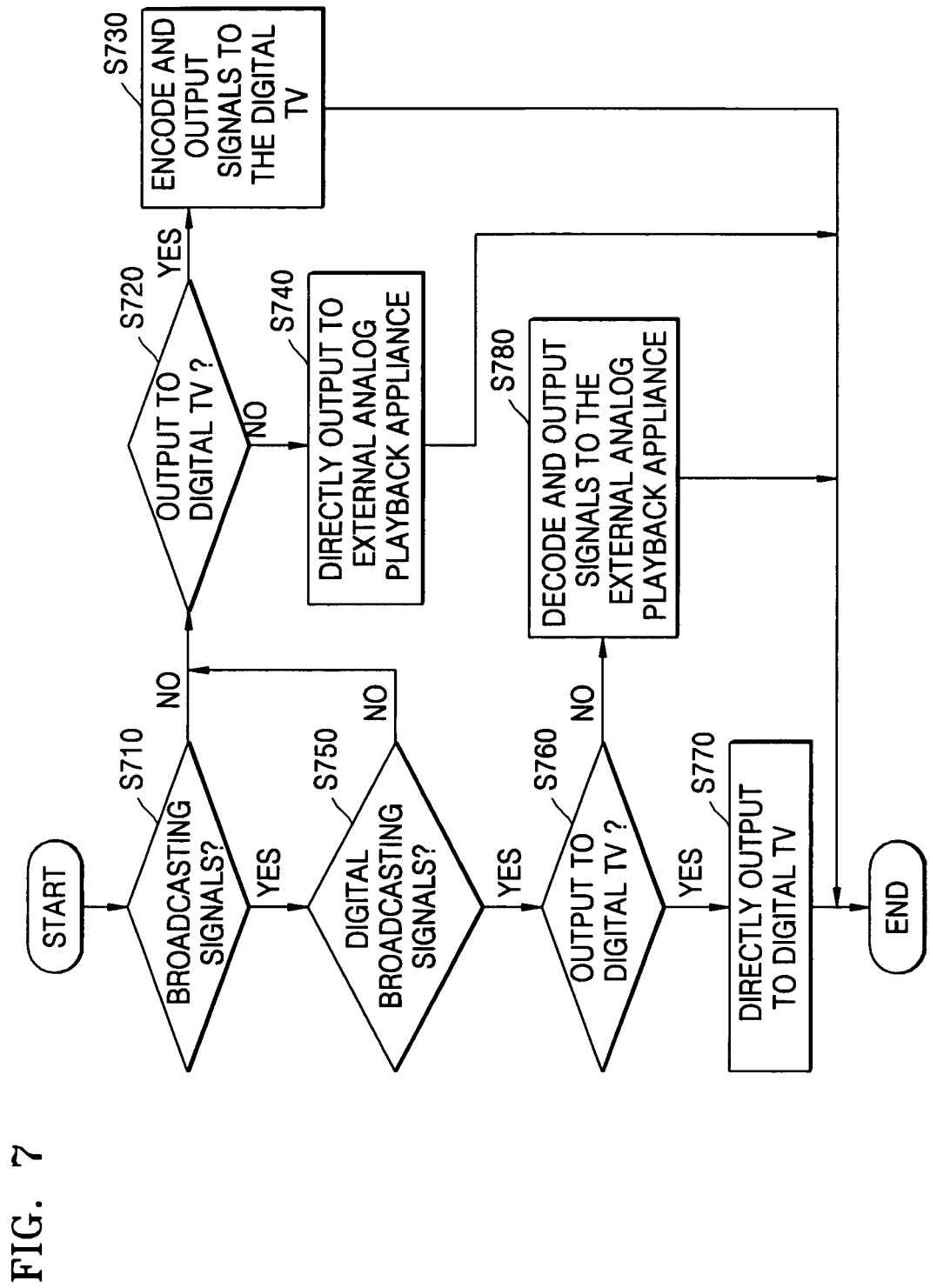
FIG. 7 is a flowchart illustrating a signal processing method of a multi-purpose digital set-top box according to an embodiment of the present invention.

FIG. 7 is a flowchart of the signal processing method of outputting analog broadcasting signals and external analog signals to an external analog playback appliance such as an analog TV or a VCR without encoding and decoding. In an operation S710 of FIG. 7, when a user selects to input external analog signals by a signal inputting method selected with a remote control, etc., in an operation S720, it is determined whether or not a user selects to output the external analog signals with a digital TV, and in an operation S730, the external analog signals are encoded into digital broadcasting signals and are output to a digital TV, or in an operation S740, the external analog signals are directly output to an external analog playback appliance, and then the process ends.

In the meantime, in the operation S750, when a user selects the set-top box 20 to receive broadcasting signals in an operation S710, it is determined whether a user selects to receive digital broadcasting or analog broadcasting. When a user selects to receive the digital broadcasting, in an operation S760, it is determined whether a user selects to output the digital broadcasting with the digital TV or the external analog playback appliance, and in an operation S770, digital broadcasting signals are directly output to the digital TV, or in an operation S780, the digital broadcasting signals are output to the external analog playback appliance after decoding the digital broadcasting signals. When a user selects to receive the analog broadcasting in the operation S750, the process goes to the operation S720, in the operation S730, the analog broadcasting is output to the digital TV, or in the operation S740, the analog broadcasting is directly output to the external analog playback appliance after encoding analog broadcasting signals, like when a user selects the external analog broadcasting signals.

Figure 8:
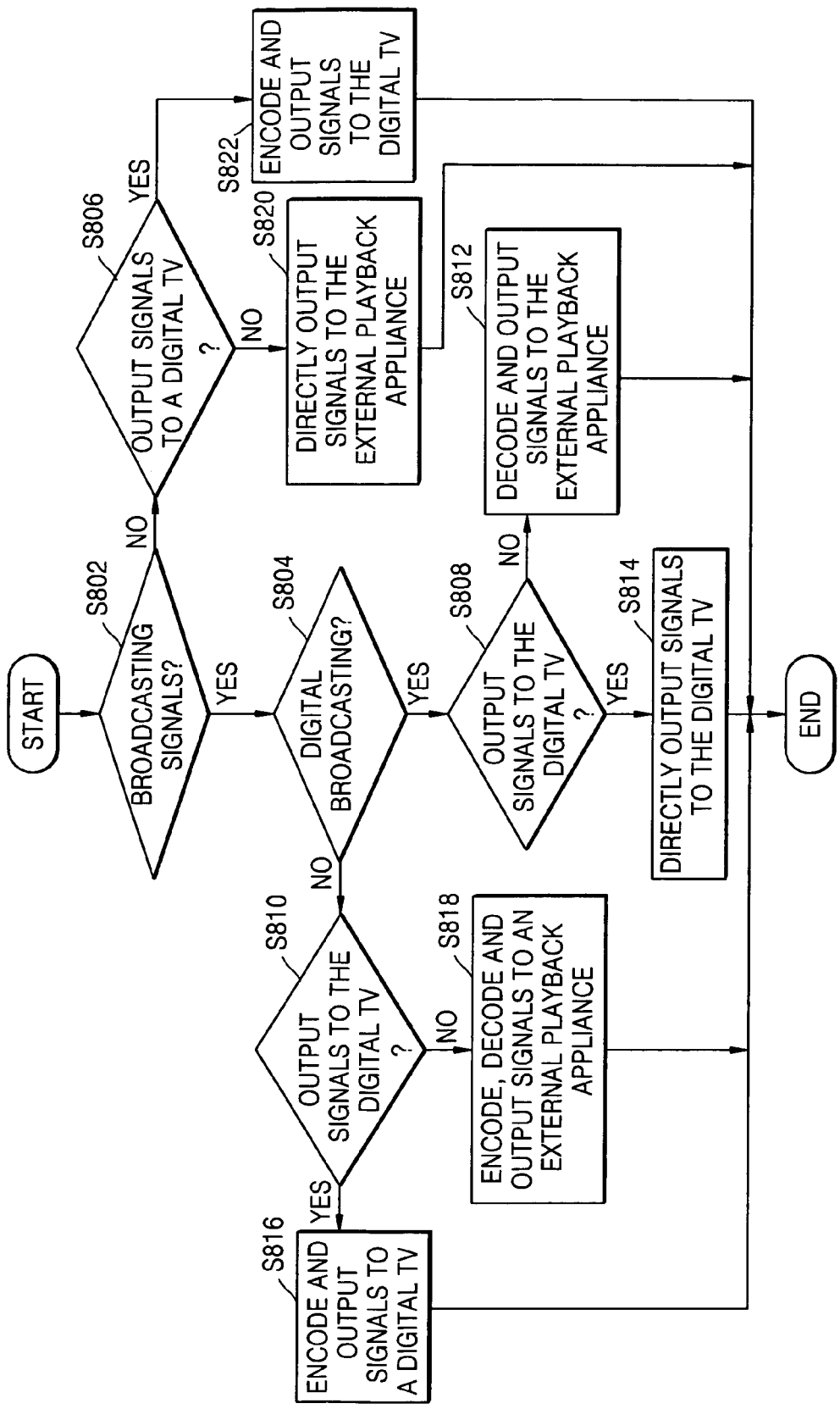
FIG. 8 is a flowchart illustrating the signal processing method of the multi-purpose digital set-top box according to an embodiment of the present invention.

FIG. 8 is a flowchart of a signal processing method of outputting analog broadcasting signals to an external analog playback appliance after encoding and decoding, and directly outputting external analog signals to the external analog playback appliance without encoding and decoding. FIG. 8 is different from FIG. 7 in that only external analog signals are directly output to the external analog playback appliance.

When a user selects to input external analog signals by a signal inputting method selected with a remote control, etc., in an operation S802, it is determined whether or not a user selects to output to a digital TV in an operation S806, and in an operation S822, external analog signals are encoded into digital broadcasting signals and are output to a digital TV, or in an operation S820, the external analog signals are directly output to the external analog playback appliance, and then the process ends.

In the meantime, when a user selects the set-top box 20 to receive broadcasting signals in the operation S802, in an operation S804, it is determined whether a user selects to receive digital broadcasting or analog broadcasting. When a user selects to receive the digital broadcasting, in an operation S808, it is determined whether a user selects to output to the digital TV or the external analog playback appliance, and in an operation S814, the digital broadcasting signals are directly output to the digital TV, or in an operation S812, the digital broadcasting signals are output to the external analog playback appliance after decoding the digital broadcasting signals. When a user selects to receive the analog broadcasting in the operation S804, the process goes to an operation S810 and determines whether a user selects to output to the digital TV or the external analog playback appliance, and then in an operation S816, the analog broadcasting is output to the digital TV after encoding analog broadcasting signals, or in an operation S818, the analog broadcasting is directly output to the external analog playback appliance after encoding and decoding analog broadcasting signals.

As described above, according to the present invention, it is possible to simply regenerate the externally-input analog signals and/or analog broadcasting signals without eliminating copy protection signals and without a complicated operation process when the externally-input analog signals and/or the analog broadcasting signals pass through the copy protection process.

What is claimed is:

1. An analog/digital signal processor for receiving input signals as analog signals or digital signals and outputting the input signals to a predetermined appliance through an analog communication unit or a digital communication unit, the processor comprising:
   a control unit determining whether the input signals are digital signals or analog signals to generate a determination result and controlling a processing path and an output path of the input signals in accordance with the determination result;
   a switching unit switching the input signals to the analog communication unit or the digital communication unit under a control of the control unit; and
   an encoding unit encoding the input signals to generate encoded input signals and a decoding unit decoding the encoded input signals encoded by the encoding unit or the input signals,
   wherein, according to user selection, the switching unit outputs the input signals that are analog signals to one of the analog communication unit without encoding the input signals and the encoding unit.

2. The analog/digital signal processor according to claim 1, wherein when the input signals are analog signals, the control unit sets the processing path of the input signals to the switching unit and the switching unit switches the input signals to the analog communication unit, in accordance with the user selection.

3. An analog/digital signal processor for receiving input signals as analog signals or digital signals and outputting the input signals to a predetermined appliance through an analog communication unit or a digital communication unit, the processor comprising:
   a control unit determining whether the input signals are digital signals or analog signals to generate a determination result and controlling a processing path and an output path of the input signals in accordance with the determination result;
   a switching unit switching the input signals to the analog communication unit or the digital communication unit under a control of the control unit; and
   an encoding unit encoding the input signals to generate encoded input signals and a decoding unit decoding the encoded input signals encoded by the encoding unit or the input signals,
   wherein when the input signals are digital signals, the control unit sets the processing path of the input signals to the decoding unit, and the decoding unit decodes the input signals and outputs the decoded input signals to the analog communication unit.

4. An analog/digital signal processor for receiving input signals as analog signals or digital signals and outputting the input signals to a predetermined appliance through an analog communication unit or a digital communication unit, the processor comprising:
   a control unit determining whether the input signals are digital signals or analog signals to generate a determination result and controlling a processing path and an output path of the input signals in accordance with the determination result;
   a switching unit switching the input signals to the analog communication unit or the digital communication unit under a control of the control unit; and
   an encoding unit encoding the input signals to generate encoded input signals and a decoding unit decoding the encoded input signals encoded by the encoding unit or the input signals,
   wherein when the input signals are analog signals, the control unit sets the processing path of the input signals to the switching unit, the switching unit switches the input signals to the encoding unit, and the encoding unit encodes the input signals into digital signals and outputs the digital signals to the digital communication unit.

5. The analog/digital signal processor according to claim 1, wherein the received input signals are playback signals regenerated by the predetermined appliance.

6. An analog/digital signal processor for receiving input signals as analog signals or digital signals and outputting the input signals to a predetermined appliance through an analog communication unit or a digital communication unit, the processor comprising:
   a broadcasting signal receiving unit receiving and processing broadcasting signals including at least one of ground wave broadcasting signals, cable broadcasting signals, and satellite broadcasting signals;
   an external signal receiving unit receiving playback signals regenerated by the predetermined appliance;
   a control unit determining whether the input signals received by the broadcasting signal receiving unit and the external signal receiving unit are digital signals or analog signals to generate a determination result and controlling a processing path and an output path of the input signals in accordance with the determination result;

a switching unit switching the input signals to the analog communication unit or the digital communication unit under a control of the control unit; and an encoding unit encoding the input signals and a decoding unit decoding the input signals encoded by the encoding unit, the broadcasting signals, and the playback signals, wherein, according to user selection, the switching unit outputs the input signals that are analog signals to one of the analog communication unit without encoding the input signals and the encoding unit.

7. The analog/digital signal processor according to claim 6, wherein when the playback signals are analog signals, the control unit sets the processing path of the playback signals to the switching unit and the switching unit switches the playback signals to the analog communication unit, in accordance with the user selection.

8. The analog/digital signal processor according to claim 6, wherein when the broadcasting signals are analog signals, the control unit sets the processing path of the broadcasting signals to the switching unit and the switching unit switches the broadcasting signals to the analog communication unit, in accordance with the user selection.

9. An analog/digital signal processor for receiving input signals as analog signals or digital signals and outputting the input signals to a predetermined appliance through an analog communication unit or a digital communication unit, the processor comprising:

a broadcasting signal receiving unit receiving and processing broadcasting signals including at least one of ground wave broadcasting signals, cable broadcasting signals, and satellite broadcasting signals;

an external signal receiving unit receiving playback signals regenerated by the predetermined appliance;

a control unit determining whether the input signals received by the broadcasting signal receiving unit and the external signal receiving unit are digital signals or analog signals to generate a determination result and controlling a processing path and an output path of the input signals in accordance with the determination result;

a switching unit switching the input signals to the analog communication unit or the digital communication unit under a control of the control unit; and an encoding unit encoding the input signals and a decoding unit decoding the input signals encoded by the encoding unit, the broadcasting signals, and the playback signals, wherein when the input signals are digital signals, the control unit sets the processing path of the input signals to the decoding unit and the decoding unit decodes the input signals into the analog signals and outputs the analog signals to the analog communication unit.

10. An analog/digital signal processor for receiving input signals as analog signals or digital signals and outputting the input signals to a predetermined appliance through an analog communication unit or a digital communication unit, the processor comprising:

a broadcasting signal receiving unit receiving and processing broadcasting signals including at least one of ground wave broadcasting signals, cable broadcasting signals, and satellite broadcasting signals;

an external signal receiving unit receiving playback signals regenerated by the predetermined appliance;

a control unit determining whether the input signals received by the broadcasting signal receiving unit and the external signal receiving unit are digital signals or analog signals to generate a determination result and controlling a processing path and an output path of the input signals in accordance with the determination result;

a switching unit switching the input signals to the analog communication unit or the digital communication unit under a control of the control unit; and an encoding unit encoding the input signals and a decoding unit decoding the input signals encoded by the encoding unit, the broadcasting signals, and the playback signals, wherein when the input signals are analog signals, the control unit sets the processing path of the input signals to the switching unit and the switching unit switches the input signals to the encoding unit.

11. A multi-purpose digital set-top box for receiving and processing broadcasting signals and externally-input analog signals and outputting the processed broadcasting signals and the processed externally-input analog signals to an external digital display appliance or an external analog playback appliance through a digital communication unit or an analog communication unit, the set-top box comprising:

an encoding unit encoding the externally-input analog signals into digital signals and outputting the digital signals to the digital communication unit;

a switching unit switching the externally-input analog signals to at least one of the encoding unit and the analog communication unit, according to user selection;

a control unit controlling operations of the set-top box; and a decoding unit decoding the digital signals into analog signals and outputting the analog signals, wherein when the broadcasting signals are analog broadcasting signals, the analog broadcasting signals are encoded into digital broadcasting signals by the encoding unit and output to the digital communication unit or the decoding unit that decodes the digital broadcasting signals into the analog broadcasting signals, and the switching unit switches the output of the decoding unit to the analog communication unit, according to the user selection, and wherein the analog communication unit is directly connected to the external analog playback appliance and the digital communication unit is directly connected to the external digital display appliance.

12. The multi-purpose digital set-top box according to claim 11, wherein when the broadcasting signals are the analog broadcasting signals, the analog broadcasting signals are encoded into digital broadcasting signals by the encoding unit and output to the digital communication unit if the user selection is for the external digital display appliance, or switched to the analog communication unit by the switching unit if the user selection is for the external analog playback appliance.

13. The multi-purpose digital set-top box according to claim 11, wherein the digital communication unit communicates with the external digital display appliance through a radio communication channel.

14. The multi-purpose digital set-top box according to claim 11 further comprising a communication module, wherein the communication module comprises the digital communication unit and the analog communication unit.

15. A signal processing method of a multi-purpose digital set-top box for receiving and processing broadcasting signals and externally-input analog signals and outputting the processed broadcasting signals and the processed externally-input analog signals to an external digital display appliance or an external analog playback appliance, the method comprising:

(a) encoding the externally-input analog signals into digital signals and outputting the digital signals to the external digital display appliance through a first communication unit;

(b) outputting the externally-input analog signals to the external analog playback appliance through a second communication unit, wherein the (a) and (b) are preformed simultaneously or selectively, wherein when the broadcasting signals are analog broadcasting signals, the method further comprises:

(c) encoding the analog broadcasting signals into digital broadcasting signals;

(d) outputting the digital broadcasting signals to the external digital display appliance; and (e) decoding the digital broadcasting signals into analog broadcasting signals and outputting the analog broadcasting signals to the external analog playback appliance, and wherein the (d) and (e) are simultaneously or selectively performed.

16. The signal processing method according to claim 15, wherein when the broadcasting signals are the analog broadcasting signals, the analog broadcasting signals are directly output to the external analog playback appliance according to a user selection without performing operations (c), (d) and (e).

17. The signal processing method according to claim 15, wherein the set-top box and the external digital display appliance communicate with each other through a radio communication channel.

18. The analog/digital signal processor of claim 1, wherein the switching unit outputs the input signals that are analog signals to the analog communication unit if the user selection is for an analog display device and the switching unit outputs the input signals that are analog signals to the encoding unit if the user selection is for a digital display device.

* * * * *